(12) United States Patent
Hülsemann

(10) Patent No.: US 10,265,836 B2
(45) Date of Patent: Apr. 23, 2019

(54) CONVEYING, DRIVING AND PRESSING BELT WITH REINFORCING INSERT

(71) Applicant: Thomas Hülsemann, Oberhausen (DE)

(72) Inventor: Thomas Hülsemann, Oberhausen (DE)

( * ) Notice: Subject to any disclaimer, the term of this patent is extended or adjusted under 35 U.S.C. 154(b) by 0 days.

(21) Appl. No.: 15/726,546

(22) Filed: Oct. 6, 2017

(65) Prior Publication Data

US 2018/0099381 A1 Apr. 12, 2018

(30) Foreign Application Priority Data

Oct. 11, 2016 (DE) .................. 10 2016 012 035

(51) Int. Cl.
| | |
|---|---|
| *F16G 1/10* | (2006.01) |
| *B24D 11/02* | (2006.01) |
| *B65G 15/30* | (2006.01) |
| *F16G 1/16* | (2006.01) |
| *F16G 1/12* | (2006.01) |
| *B24B 21/18* | (2006.01) |

(52) U.S. Cl.
CPC .............. *B24D 11/02* (2013.01); *B24B 21/18* (2013.01); *B65G 15/30* (2013.01); *F16G 1/10* (2013.01); *F16G 1/12* (2013.01); *F16G 1/16* (2013.01); *Y10T 428/197* (2015.01)

(58) Field of Classification Search
CPC ......... Y10T 428/197; F16G 1/10; F16G 1/12; F16G 1/16; F16G 1/21; F16G 3/10; B65G 15/30; B24D 11/06; B24D 11/065
See application file for complete search history.

(56) References Cited

U.S. PATENT DOCUMENTS 3,217,555 A * 11/1965 Brooksbank ........... B65G 15/34
156/202
9,702,853 B2 * 7/2017 Wallace ................ B65G 43/02

FOREIGN PATENT DOCUMENTS

| DE | 3728445 A1 | 3/1989 |
|---|---|---|
| DE | 102014013741 B3 | 12/2015 |
| GB | 851999 A | 10/1960 |
| GB | 957731 A | 5/1964 |
| GB | 957732 A | 5/1964 |
| GB | 1023815 A | 3/1966 |

* cited by examiner

*Primary Examiner* — Alexander S Thomas
(74) *Attorney, Agent, or Firm* — Michael Soderman

(57) ABSTRACT

A transport, driving or pressing belt, comprising at least one belt material having a lower and an upper face limited by two longitudinal edges and two transverse edges running obliquely with respect to the main extension direction of the belt, the belt material being closed and the longitudinal edges being folded down, and a method for manufacturing a transport, driving or pressing belt. To ensure high tensile strength over the complete belt length and avoid an edge tearing of the first belt material at the longitudinal edges, the transverse edges of a first belt material lie against each other in abutting relationship, and a second belt material is arranged centrically on the first belt material at least in the region of the transverse edges. The second belt material here nearly covers a width of 50% of the first belt material and is centrically glued with the first belt material.

14 Claims, 2 Drawing Sheets

CONVEYING, DRIVING AND PRESSING BELT WITH REINFORCING INSERT

CROSS REFERENCE TO RELATED APPLICATIONS

This application claims the priority of DE 102016012035.5 filed on 2016 Oct. 11; this application is incorporated by reference herein in its entirety.

BACKGROUND

The invention relates to a transport, driving or pressing belt, in particular for belt grinding machines, comprising at least one belt material having a lower and an upper face limited by two longitudinal edges and two transverse edges extending obliquely with respect to the main extension direction of the belt, the belt material being closed and the longitudinal edges being folded down, and a method for manufacturing a transport, driving or pressing belt.

For grinding material surfaces, belt grinding machines require abrasive belts which are guided over rollers and are simultaneously driven by the rollers so that the abrasive belts move continuously. The abrasive belts are here embodied as endless or continuous abrasive belts, that means the ends are connected to each other by suited measures.

In use, the abrasive belts are pressed against the surface of the workpiece, which may be accomplished, for example, by compressed air or mechanical pressing devices. Here, the pressing device usually has a pressing belt guided over rollers which is employed in a mechanical pressing device. Such a pressing device with a pressing belt is known, for example, from German patent application 10 2014 013 741 A1.

The employed pressing belts are normally made of a woven textile of natural or plastic fibres, the two transverse edges of a finite woven textile web being connected to each other. A first possibility is to arrange the transverse edges in an overlapping manner and to connect them, preferably glue them or use a bonding sheet which is to connect the two transverse edges to each other. Due to the bonding sheet, a belt thickening results which may cause problems in individual cases.

Alternative possibilities of fastening the two transverse edges to produce a continuous belt, for example rivet fastening, is not possible in this case since irregularities of the pressing belt are transferred via the abrasive belt to the surface of the workpiece due to an increased grinding or polishing pressure on the workpiece. Here, the belts may be used as pressing belt, but also as transport or driving belt, if a sufficient useful life of the belts is ensured.

In the course of the application of the transport, driving or pressing belts it turned out that the longitudinal edges are far more stressed than the other region of the belts. The reason for this is that a deflection is effected by the rollers and the belts may additionally be subjected to torsion. If such a belt is used as intended, apart from the longitudinal edges, the connecting region between the two interconnected transverse belts is also stressed above average, thus limiting the useful life of such a belt. Normally, the woven textile of which the belt consists ravels at the longitudinal edges, and in the region of the connection of the two transverse edges, the connection is released, which may finally lead to a tearing of the belt. The edges of the transverse edges thus form the weakest point of the connection of the belts because it has the lowest resistance against the acting peeling forces, and simultaneously, the highest peeling forces occur there in case of a torsion of the belt. Thus, the two longitudinal edges and the connecting region of the two transverse edges are to be considered as critical points which may lead to a structural integrity in use.

The indicated problems also occur in transport or driving belts, leading to the same disadvantages.

From British patent specification GB 957 731 A, a continuous belt is known which is put together in abutting relationship and folded down at the longitudinal edges, whereby the folded down side edges are only connected with the top or bottom side of the driving belt. Such driving belts, however, tend to tear at the joint of the transverse edges and thus also only have a limited service life.

From British patent specification GB 851 999 A, too, a continuous belt is known which is put together without overlap and provided with a loop which connects the ends and which is connected to the top and bottom sides of the continuous belt. Especially in this embodiment, belt thickenings may occur which are undesired in many cases.

SUMMARY

The invention relates to a transport, driving or pressing belt 1, in particular for belt grinding machines, comprising at least one belt material 2 having a lower and an upper face limited by two longitudinal edges 3,4 and two transverse edges 5, 6 running obliquely with respect to the main extension direction of the belt, the belt material 2 being closed and the longitudinal edges 3, 4 being folded down, and a method for manufacturing a transport, driving or pressing belt 1.

To ensure high tensile strength over the complete belt length and avoid an edge tearing of the first belt material 2 at the longitudinal edges 3, 4, it is provided according to the invention that the transverse edges 5, 6 of a first belt material 2 are lying against each other in abutting relationship, and a second belt material 10 is arranged centrically on the first belt material 2 at least in the region of the transverse edges 5, 6. The second belt material 10 here nearly covers a width of 50% of the first belt material 2 and is centrically glued with the first belt material 2. By folded-in longitudinal edges 3, 4, the second belt material 10 is bordered, whereby a three-layer arrangement is formed at least in the region of the transverse edges 5, 6 of the first belt material 2. In a preferred embodiment, the three-layer design is formed over the complete face of the glued first and second belt materials 2, 10.

DETAILED DESCRIPTION

It is the object of the present invention to indicate a transport, driving or pressing belt whose useful life is clearly extended compared to the belts known from prior art and which moreover has a preferably uniform belt thickness.

According to the invention, the solution of the object is that the transverse edges are lying against each other in abutting relationship and a second belt material is arranged centrically on the first belt material at least in the region of the transverse edges and nearly covers 50% of the belt's width and is bordered by the folded edges, whereby a three-layer arrangement is formed at least in the region of the transverse edges of the first belt material.

Further advantageous developments can be taken from the subclaims.

The invention proposes a novel transport, driving or pressing belt in which the transverse edges are placed against each other in abutting relationship, and a second belt material is arranged centrically on the first belt material at least in the region of the transverse edges. The second belt material here covers up to 50% of the belt's width and is bordered by the folded edges. By this, a three-layer arrangement is formed at least in the region of the transverse edges of the belt. The second belt material is here arranged centrically to the first belt material in the longitudinal direction. By folding down the longitudinal edges onto the second belt material, the latter is completely embedded in the first belt material, while the longitudinal edges nearly touch each other in the middle. It is achieved thereby that the second central belt material is completely surrounded by the first belt material, and in the first embodiment, a three-layer design is present over the region of the transverse edges.

To obtain sufficient tensile strength and an increased lateral stability, it is sufficient for the second belt material to be arranged in the region of the transverse edges to achieve the corresponding strength. In a particular embodiment, the second belt material may be embodied over the complete area of the belt and be bordered by the longitudinal edges of the first belt material, whereby a three-layer design is formed over the complete area. This embodiment is particularly suited for cases of application where no belt thicknesses must occur, for example in pressing belts for abrasive belts.

In a further development of the invention, it is provided that both the first and the second belt materials consist of the same material to be able to cause a particularly effective bonding. It is an alternative possibility for the second belt material to either have a lower or a higher tensile strength in the longitudinal direction. By this, with the second belt material, the tensile strength of the belt may be extremely influenced, so that it is, for example, possible to use an outer first belt material with low tensile strength which, however, has a surface finish of higher quality. By the second belt material being completely bordered by the first belt material after the longitudinal edges have been folded in, the tensile strength in the longitudinal direction of the transport, driving or pressing belt is thus present over the complete width of the belt. By different materials for the first and second belt materials, thus either the reinforcement of the tensile strength and/or the surface finish may be influenced.

If the second belt material is only embodied as a material with high tensile strength and accordingly has a surface finish that cannot withstand any major stresses, the advantage comes to the fore that the second belt material, after the edges of the first belt material have been folded in, the two outer edges nearly touch each other whereby the second belt material is completely embedded. Thus, the surface finish is only determined by the first belt material.

To further increase strength, it is provided that the folded edge regions are glued to the upper or lower faces, depending on the direction into which the edge regions are folded, preferably they are glued all-over the surface. Gluing is insofar preferred as a large-surface connection of the two transverse edges on the one hand and the folded regions with the upper or lower face on the other hand are effected, whereby the connections withstand higher mechanical loads which is exactly the essential aim of the inventive transport, driving or pressing belt.

In a further development of the invention, it is provided that between the folded regions and the upper or lower face, reinforcement fibres, strings or wires are arranged. By the reinforcing fibres, too, the tensile strength may be further increased for special cases. Here, it is provided that the reinforcing fibres, strings or wires are oriented essentially in the main extension direction of the belt and consist of plastic, natural fibres or a flexible metal. This measure increases the tearing resistance, and a low extensibility of the transport, driving or pressing belt according to the invention is achieved. As plastics, Kevlar (aromatic polyamides) is preferably used.

Such reinforcing fibres, strings or wires may be embedded in an adhesive layer disposed between the folded regions and the upper or lower face and contribute to the tearing resistance and lower extensibility of the transport, driving or pressing belt according to the invention. Here, it is on the one hand possible to arrange individual reinforcing fibres, strings or wires in parallel to the main extension direction of the belt, and on the other hand to arrange a fabric (laying) or woven textile of reinforcing fibres, strings or wires between the folded regions and the upper face or the lower face.

It is provided in accordance with the invention that the transverse edges with the main extension direction of the belt include an angle unequal 90 degrees, i. e. do not include a right angle with the main extension direction of the belt. By this measure, the transverse edges of the belt are longer than in the case where they include, with the main extension direction of the belt, a right angle, whereby the connection of both transverse edges withstands higher stresses. Furthermore, with such obliquely extending transverse edges, an impact effect while the belt is being guided over rollers is prevented.

In a further development of the invention, it is provided that the folded regions are connected with pressing elements. The connection is here preferably effected by gluing, wherein such pressing elements, if a pressing belt is used as intended, offer the possibility of exerting a grinding pressure onto an abrasive belt. The pressing elements may consist, for example, of felt, rubber or graphite.

The upper and lower faces comprise a width of 30 to 400 mm, while compared to this, the thickness of the belt before the longitudinal edges are folded over is 0.1 to 2 mm. Here, by the folding, it may preferably be achieved that a woven textile of a smaller thickness than is common for manufacturing such a belt is employed, because the thickness of the transport, driving or pressing belt according to the invention is increased after the side edges are folded over, and after the gluing with the folded regions with the upper or lower face due to the thus achieved three-layer design. Here, it is in particular provided that the second belt material is also glued onto the first belt material before the longitudinal edges are folded in. Thus, there are two adhesive layers which nearly exclude a detachment of the first belt material. Moreover, the edge regions are particularly protected by the folded down longitudinal edges and edge tearing is prevented. Only at one point of the transport, driving or pressing belt, namely where the transverse edges abut, there could be a weak point, however, the inner second belt material ensures that an edge tearing at the butt seam of the transverse edges is excluded.

Due to the gluing and folding in of the longitudinal edges, a particularly high strength is achieved which is supported by the second internal belt material, even if it preferably has the highest tensile strength in the longitudinal direction of the belt. The tensile strength in the direction of the belt, however, is accompanied by corresponding transverse forces which prevent an edge tearing. Moreover, the joint transverse edges placed in abutting relationship extend over an angle of 45° with respect to the second belt material, while the occurring forces are formed transverse to the first belt material and have a lower effect on the transverse edges extending at an angle of 45°.

In a further particular development of the invention, it is provided that between the folded regions and the upper face and/or lower face, at least one detection element is arranged. The detection element may consist, for example, of metal, so that the speed of the belt during operation may be detected by a corresponding sensor means. This is insofar advantageous as the speed of the belt may deviate from the rotational speed of the guide rollers by a slip, and the detection of the belt speed via the rotational speed of the guide rollers is thus prone to errors. The detection of the detection element may be accomplished by measuring a change of inductance or capacitance. To this end, the belt may be guided past a coil, or the belt may be guided between the electrodes of a capacitor. The detection element may furthermore be magnetic to permit detectability by means of a magnetic sensor or via electromagnetic induction.

The invention furthermore relates to a method for manufacturing a transport, driving or pressing belt, in particular for grinding machines, comprising at least one belt material having a lower and an upper face limited by two longitudinal edges and two transverse edges extending obliquely with respect to the main extension direction of the belt, the belt material being closed in itself and the longitudinal edges being folded down. To avoid the disadvantages from prior art, it is provided, for manufacturing the transport, driving or pressing belt, that the two transverse edges are placed against each other in abutting relationship and the longitudinal edges are folded onto a second belt material which is glued to the first belt material, and the folded regions are glued to the outer face of the second belt material, so that an overlapping region along the transverse edges together with the second belt material permits a three-layer arrangement at least across the region of the transverse edges.

In a particular embodiment, a three-layer arrangement over the complete length of the belt is achieved by the use of a second belt material over the complete belt length.

The present invention in particular has the advantage that the wall thickness is constant over the complete belt length, if, for example, the second belt material is used over the complete length. By this, not only an unbalance is avoided, but moreover, a uniform pressing behaviour is achieved if it is required. Insofar as the transport, driving or pressing belt is provided with a further coating, which is typically permanently elastic, it is, however, also sufficient for the second belt material to be only arranged in the region of the transverse edges. By the fact that a second belt material is employed which is folded down from the longitudinal edges of the first belt material, and a gluing of the second belt material both with the first belt material and with the folded-in longitudinal edges is accomplished, there is a high tear resistance, in particular an edge tearing at the newly formed longitudinal edges after the folding-in is prevented. In the known prior art, this is a weak point of the offered belts which is now removed by this variant of the embodiment and leads to a long useful life of the transport, driving or pressing belts according to the invention.

BRIEF DESCRIPTION OF THE DRAWINGS

The invention will be further illustrated again below with reference to the figures.

In the drawings.

DETAILED DESCRIPTION OF THE PREFERRED EMBODIMENTS

Figure 1:
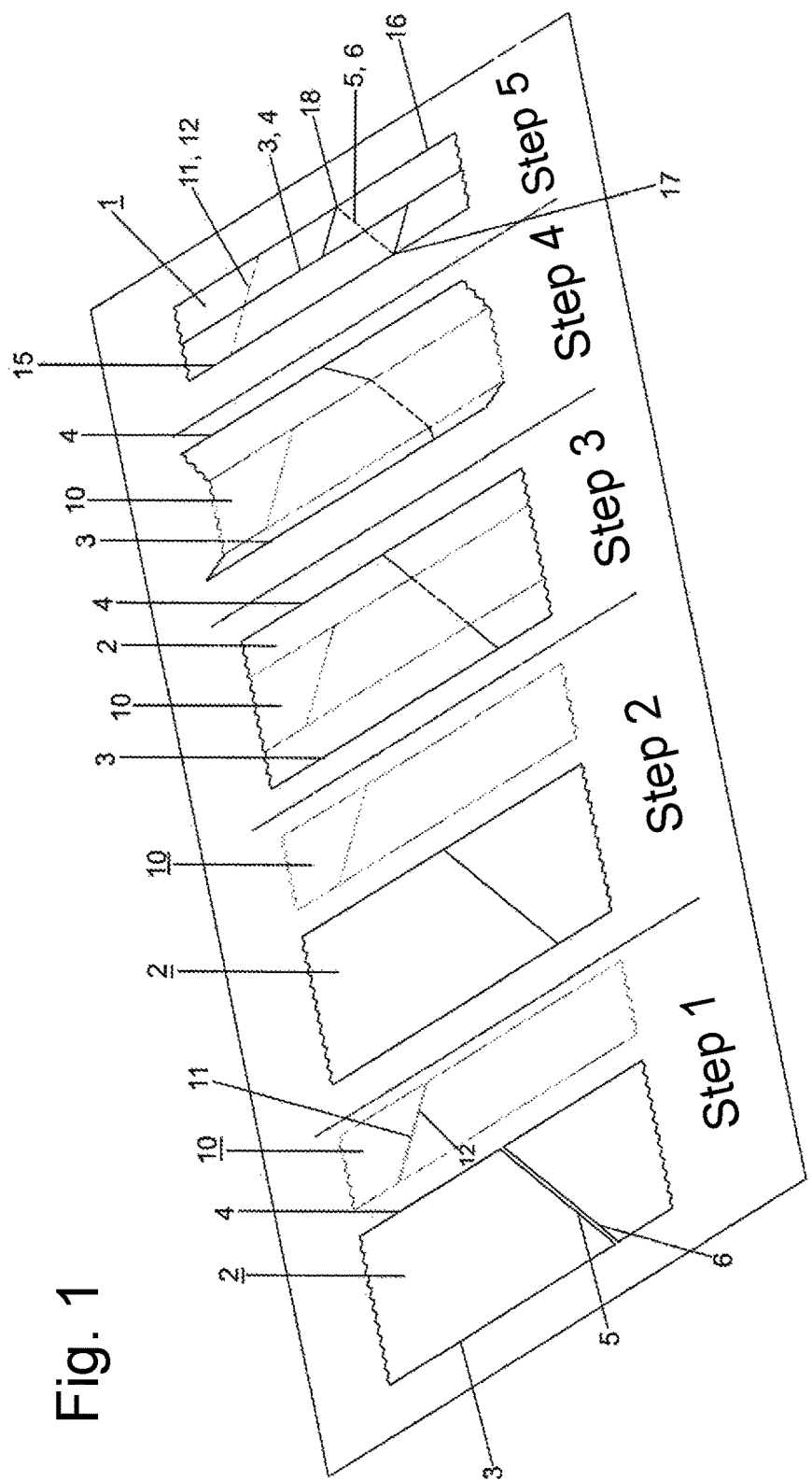
FIG. 1 shows, in a perspective view, the individual steps for manufacturing the belt.

FIG. 1 shows, in a perspective view, the individual manufacturing steps for manufacturing a transport, driving or pressing belt 1.

A first belt material 2 with longitudinal edges 3, 4 and transverse edges 5, 6 is placed against each other in abutting relationship with its transverse edges 5, 6 according to step 2. Furthermore, a second belt material 10 with transverse edges 11, 12 is placed centrically onto the first belt material 2, also lying in abutting relationship, and glued, as is shown in step three. The second belt material 10 here nearly covers up to 50% of the width of the first belt material 2, so that the longitudinal edges 3, 4 of the first belt material 2 may be folded inwards. This folding step follows after the gluing of the first and second belt materials 2, 10. The longitudinal edges 3, 4 are also glued with the upper side of the second belt material 10, so that gluing is accomplished over the whole surface of the first and second belt materials 2, 10. The folding procedure is shown in step four, while in step five, the completed transport, driving or pressing belt 1 is shown. The two longitudinal edges 3, 4 are in this case lying close to each other, quasi folded in abutting relationship, and glued with the second belt material 10. The second belt material is here also lying in abutting relationship with its transverse edges 11, 12. After the folding of the longitudinal edges 3, 4 of the first belt material 2 towards the centre, the transverse edges 5, 6 have a zigzagged arrangement in the completed transport, driving or pressing belt 1.

The advantage of this transport, driving or pressing belt 1 is that the now obtained outer longitudinal edges 15, 16 form a stable outer edge which only has a supposed weak point in one single point 17, 18. This, however, is prevented by a second belt material having been folded through the longitudinal edges, and thus a three-layer design is present for the whole length of the transport, driving or pressing belt 1.

Figure 2:
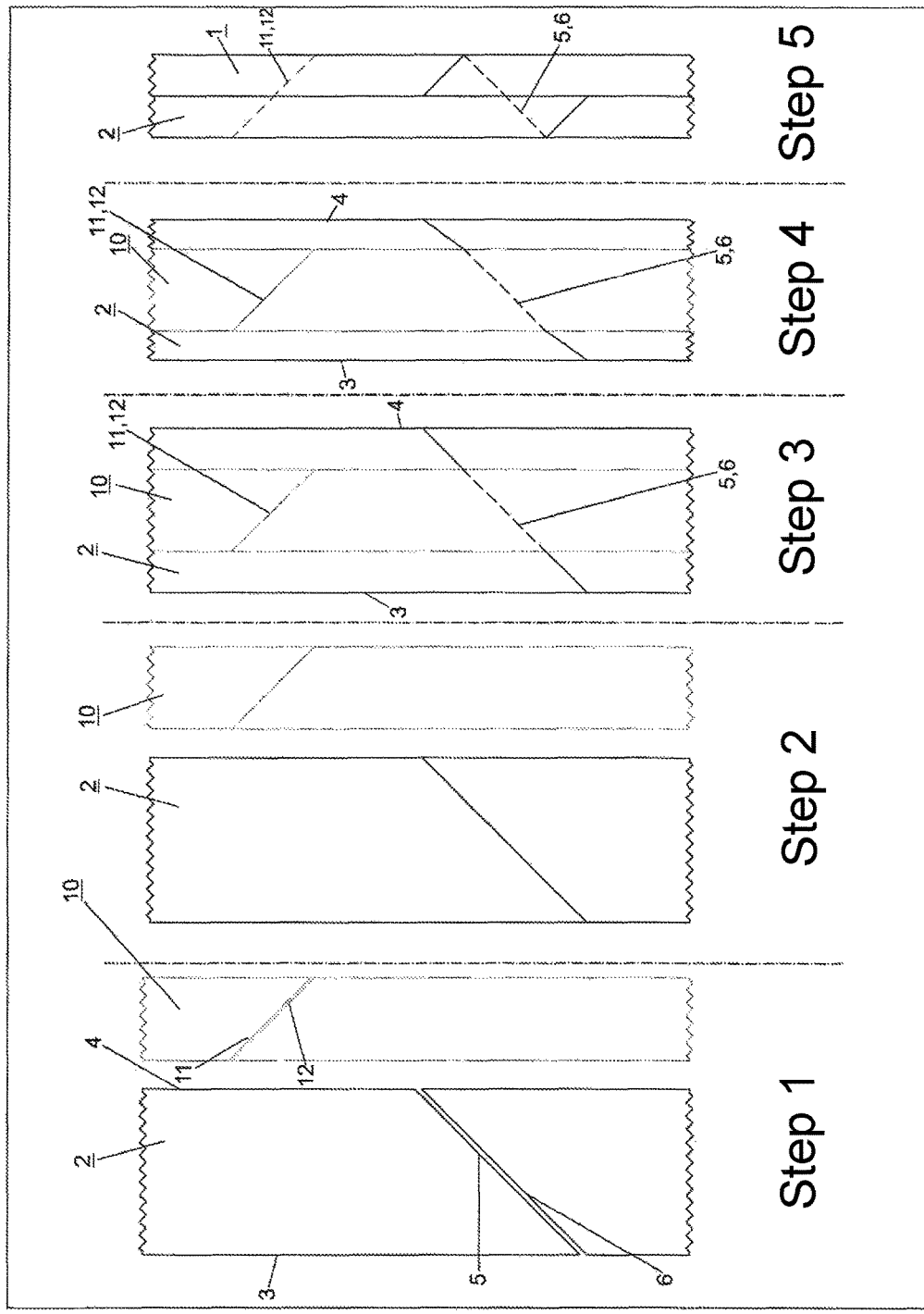
FIG. 2 shows, in a plan view, the individual steps for manufacturing the belt.

FIG. 2 shows steps 1 to 5 again in a plan view. The loose belts of the first belt material 2 are placed against each other in abutting relationship. Equally, the first 2 as well as the second belt material 10, which is subsequently glued with the first belt material 2 centrically in the longitudinal direction, are placed together. After gluing, the longitudinal edges 3, 4 of the first belt material 2 are folded in, wherein the second belt material 10 has a width of nearly 50% of the first belt material 2, so that the longitudinal edges 3, 4 may be folded completely up to the centre in abutting relationship. By the folding in, in the first belt material 2, a zigzagged arrangement of the transverse edges 5, 6 is formed, while the second belt material 10 comprises obliquely extending transverse edges 11, 12 which are not changed during the folding operation. Moreover, there is an offset between the transverse edges 3, 4 of the first belt material 2 and the transverse edges 11, 12 of the second belt material 10, so that high tensile strength may be ensured over the complete length of the transport, driving or pressing belt 1.

LIST OF REFERENCE NUMERALS 1 transport, driving or pressing belt
2 belt material
3 longitudinal edge
4 longitudinal edge
5 transverse edge
6 transverse edge
10 belt material
11 transverse edge 12 transverse edge
15 longitudinal edge
16 longitudinal edge
17 point
18 point

The invention claimed is:

1. Transport, driving or pressing belt (1), comprising at least one belt material (2) with a lower and an upper face which is limited by two longitudinal edges (3, 4) and two transverse edges (5, 6) extending obliquely with respect to the main extension direction of the belt, wherein the belt material (2) is closed and the longitudinal edges (3, 4) are folded down,
characterized in that
the transverse edges (5, 6) are lying against each other in abutting relationship, and a second belt material (10) is arranged centrically on the first belt material (2) at least in the region of the transverse edges (11, 12) and covers nearly 50% of the belt's width and is bordered by the folded edges, whereby a three-layer arrangement is formed at least in the region of the transverse edges (5, 6) of the first belt material (2), wherein
a three-layer arrangement is present over the complete face of the first belt material (2).

2. Transport, driving or pressing belt (1) according to claim 1,
characterized in that
both the first (2) and the second belt material (10) consist of the same material, or that the second belt material (10) comprises a material having a lower or higher tensile strength in the longitudinal direction.

3. Transport, driving or pressing belt (1) according to claim 1,
characterized in that
the folded edge regions are glued with the upper or lower face.

4. Transport, driving or pressing belt (1) according to claim 1,
characterized in that
between the folded regions and the upper and/or lower face, reinforcing fibres, strings or wires are arranged.

5. Transport, driving or pressing belt (1) according to claim 1,
characterized in that
reinforcing fibres, strings or wires are essentially oriented in the main extension direction of the first belt material (2).

6. Transport, driving or pressing belt (1) according to claim 1,
characterized in that
reinforcing fibres, strings or wires consist of plastic, natural fibres or metal.

7. Transport, driving or pressing belt (1) according to claim 1,
characterized in that
the folded regions are connected with pressing elements.

8. Transport, driving or pressing belt (1) according to claim 1,
characterized in that
pressing elements are glued with the folded regions.

9. Transport, driving or pressing belt (1) according to claim 1,
characterized in that
pressing elements consist of felt, rubber or graphite.

10. Transport, driving or pressing belt (1) according to claim 1,
characterized in that
the upper face and the lower face of the first belt material (2) comprises a width of 30 to 400 mm, and/or that the distance between the upper face or the lower face is 0.1 to 2 mm before the folding procedure.

11. Transport, driving or pressing belt (1) according to claim 1,
characterized in that
the folded regions each comprise 50% of the upper or lower face.

12. Transport, driving or pressing belt (1) according to claim 1,
characterized in that
between the folded regions and the upper face and/or lower face, at least one detection element is arranged.

13. Transport, driving or pressing belt (1) according to claim 1,
characterized in that
the detection element at least partially consists of metal.

14. Transport, driving or pressing belt (1), comprising at least one belt material (2) with a lower and an upper face which is limited by two longitudinal edges (3, 4) and two transverse edges (5, 6) extending obliquely with respect to the main extension direction of the belt, wherein the belt material (2) is closed and the longitudinal edges (3, 4) are folded down,
characterized in that
the transverse edges (5, 6) are lying against each other in abutting relationship, and a second belt material (10) is arranged centrically on the first belt material (2) at least in the region of the transverse edges (11, 12) and covers nearly 50% of the belt's width and is bordered by the folded edges, whereby a three-layer arrangement is formed at least in the region of the transverse edges (5, 6) of the first belt material (2), wherein
the second belt material (10) is, after the longitudinal edges (3, 4) of the first belt material (2) have been folded in, completely covered and the two longitudinal edges (3, 4) nearly touch each other.

* * * * *